United States Patent [19]
Kasami et al.

[11] Patent Number: 5,768,221
[45] Date of Patent: Jun. 16, 1998

[54] METHOD OF AND APPARATUS FOR INITIALIZING MULTI-LAYER OPTICAL RECORDING MEDIUM

[75] Inventors: Yutaka Kasami; Koichi Yasuda; Atsushi Fukumoto; Shigeki Takagawa, all of Kanagawa, Japan

[73] Assignee: Sony Corporation, Tokyo, Japan

[21] Appl. No.: 716,066

[22] Filed: Sep. 19, 1996

[30] Foreign Application Priority Data

Sep. 25, 1995 [JP] Japan .................................. 7-246219

[51] Int. Cl.⁶ .............................. G11B 13/00; G11B 3/70
[52] U.S. Cl. ........................... 369/14; 369/94; 369/284
[58] Field of Search ........................ 369/14, 15, 275.2, 369/275.1, 94, 286, 281, 284, 280, 116

[56] References Cited

U.S. PATENT DOCUMENTS

| 5,557,599 | 9/1996 | Ohkubo ........................... 369/116 |
| 5,608,715 | 3/1997 | Yokogawa et al. ............... 369/275.1 |
| 5,646,930 | 7/1997 | Furumiya ......................... 369/116 |

Primary Examiner—Tan Dinh
Attorney, Agent, or Firm—Hill & Simpson

[57] ABSTRACT

A multiple-recording-layer optical recording medium has a plurality of recording layers to be initialized by exposure to light, with a transparent layer interposed between the recording layers. Light is applied simultaneously to the to the recording layers to initialize the recording layers simultaneously.

7 Claims, 7 Drawing Sheets

F I G. 7
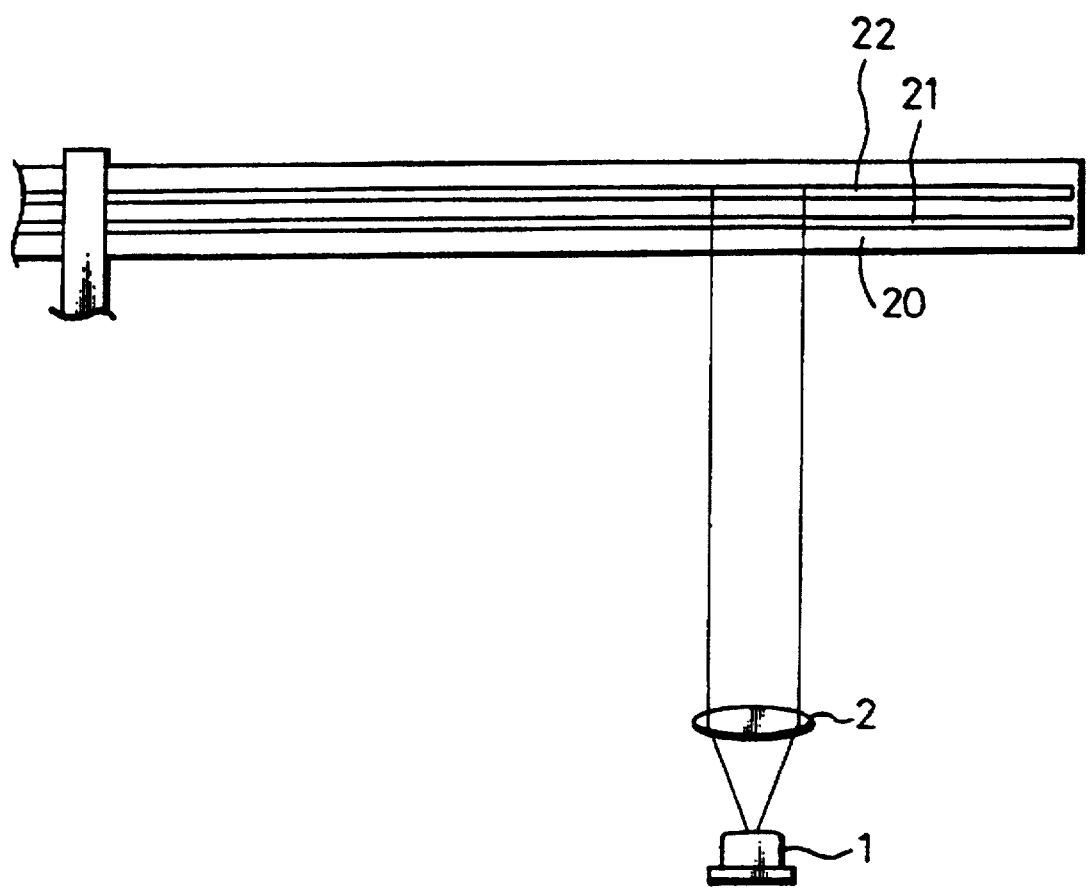

US 5,768,221

METHOD OF AND APPARATUS FOR INITIALIZING MULTI-LAYER OPTICAL RECORDING MEDIUM

BACKGROUND OF THE INVENTION

1. Field of the Invention

The present invention relates to a method of and an apparatus for initializing a laminated optical recording medium having a plurality of recording layers with the application of a light beam.

2. Description of the Related Art

There has been proposed a multiple-recording-layer optical recording medium having a plurality of information surfaces, i.e., optically reproducible or recordable layers, stacked on a transparent substrate.

If such a multiple-recording-layer optical recording medium, e.g., a multiple-layer optical disk, has n recording layers (n is an integer in the range of $n \geq 2$), then the recording density thereof is theoretically n times the recording density of a single-recording-layer optical recording medium or optical disk which has a single recording layer. Each of the layers of the multiple-recording-layer optical recording medium may comprise a memory medium of either ROM (Read-Only Memory) characteristics, WO (Write-Once) memory characteristics, or rewritable memory characteristics. Some of the layers of these memory characteristics need to be initialized. Of those memory medium types which can record information due to a change in optical characteristics that is caused by the application of a light beam having an intensity greater than a certain level, the rewritable memory mediums are highly possibly required to be initialized. For example, a phase-change disk of the rewritable type is of an amorphous state when its film is formed by sputtering. Since the phase-change disk is recorded when in an amorphous state and unrecorded when in a crystalline state, it is recorded immediately after its film is formed. It is, therefore, necessary to make the phase-change disk unrecorded by exposing the phase-change disk to a temperature higher than a crystallizing temperature.

One conventional general initializing apparatus has a single register light source having a certain wave-length and a single objective lens having a numerical aperture N.A. of 0.4 or greater, for emitting a laser beam which is focused onto a recording layer, i.e., an information surface, of an optical disk thereby to initialize the optical disk. For initializing a multiple-layer optical disk having n recording layers with the above initializing apparatus, if m (m is an integer in the range of $2 \leq m \leq n$) out of the n recording layers are to be initialized, then it takes the initializing apparatus a period of time that is m times the period of time required to initialize a single-recording-layer optical disk, resulting in a substantial reduction in the initializing efficiency.

SUMMARY OF THE INVENTION

It is an object of the present invention to provide a method of and an apparatus for initializing a multiple-recording-layer optical recording medium in a period of time which is about the same as the period of time required to initialize a single-recording-layer optical recording medium.

According to the present invention, there is provided a method of initializing a multiple-recording-layer optical recording medium, comprising the steps of providing a multiple-recording-layer optical recording medium having a plurality of recording layers to be initialized by exposure to light, with a transparent layer interposed between the recording layers, and thereafter, applying light simultaneously to the recording layers to initialize the recording layers simultaneously.

According to the present invention, there is also provided an apparatus for initializing a multiple-recording-layer recording medium having a plurality of recording layers to be initialized by exposure to light, with a transparent layer interposed between the recording layers, comprising light applying means for applying light simultaneously to the recording layers to initialize the recording layers simultaneously.

Since the recording layers are simultaneously irradiated with light and hence simultaneously initialized thereby, large-capacity optical recording mediums can be initialized in a short period of time, and therefore information can be recorded on the large-capacity optical recording mediums in a short period of time.

The transparent layer is transmissive of light which is applied to the optical recording medium.

The above and other objects, features, and advantages of the present invention will become apparent from the following description of illustrative embodiments thereof to be read in conjunction with the accompanying drawings, in which like reference numerals represent the same or similar objects.

BRIEF DESCRIPTION OF THE DRAWINGS

FIG. 7 is a schematic diagram of an initializing apparatus according to a fifth embodiment of the present invention.

DETAILED DESCRIPTION OF THE PREFERRED EMBODIMENTS

First, optical recording mediums to be initialized according to the present invention will be described below with reference to FIGS. 1 and 2. However, the optical recording mediums to be initialized according to the present invention are not limited to the structures shown in FIGS. 1 and 2.

Figure 1:
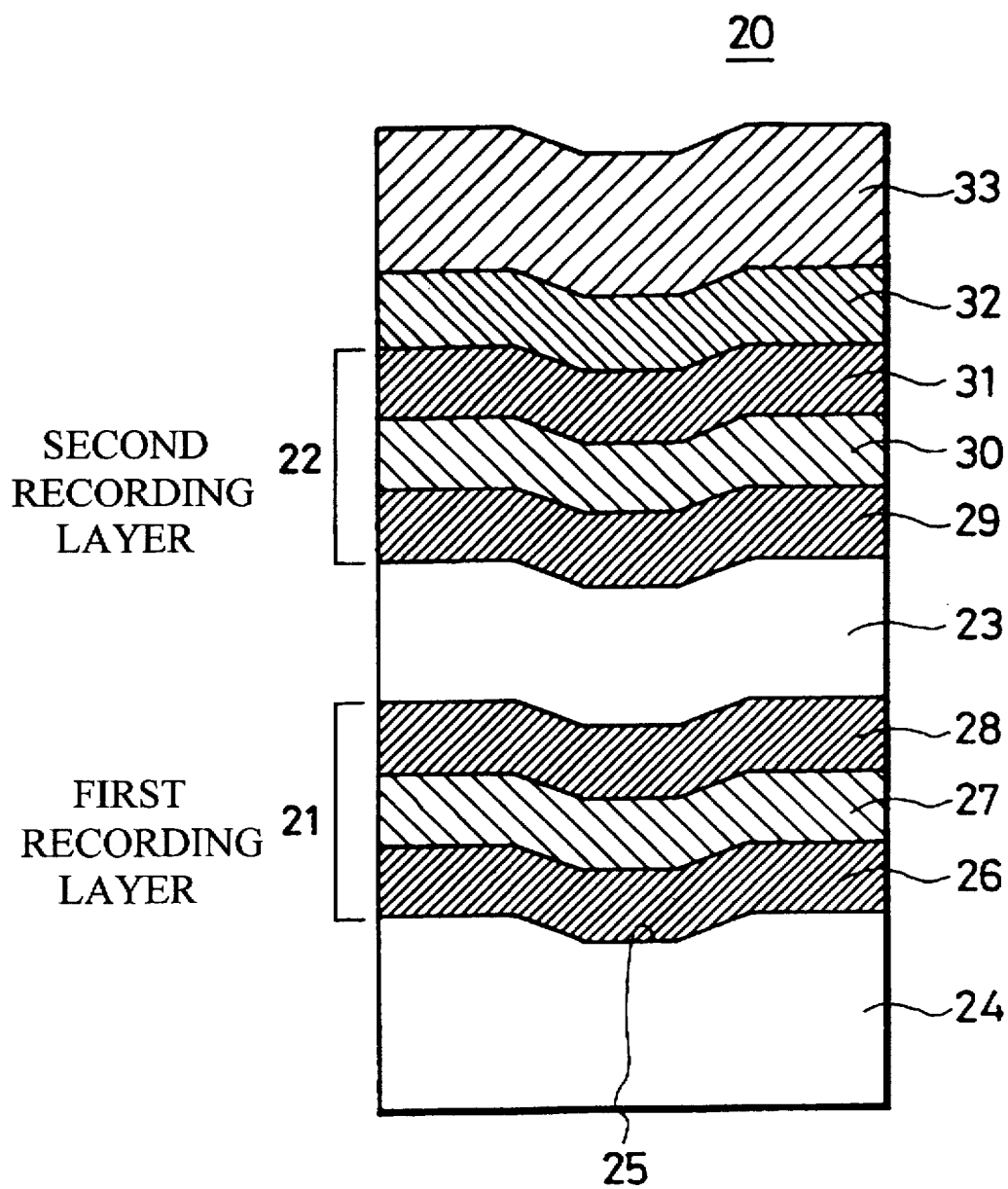
FIG. 1 is a fragmentary cross-sectional view of an optical recording medium to be initialized according to the present invention.

FIG. 1 shows in fragmentary cross section an optical recording medium 20 in the form of a phase-change optical disk having a first information recording layer 21 disposed on a transparent substrate 24 and a second first information recording layer 22 disposed on a transparent layer 23 which is mounted on the first information recording layer 21. The first and second information recording layers 21, 22 record information by way of a change in an optical property, e.g., transmittance or reflectance, due to a phase change.

As shown in FIG. 1, the transparent substrate 24 comprises a polycarbonate substrate, for example, having on its principal surface small surface depressions 25 such as tracking servo grooves or the like. The small surface depressions 25 may be produced in the principal surface of the transparent substrate 24 when the transparent substrate 24 is injection-molded or may be defined in the principal surface of a flat transparent substrate with an ultraviolet-curing resin by photopolymerization.

The first information recording layer 21 is formed by depositing a first dielectric film or protective film 26 of a mixture of ZnS and SiO$_2$ to a thickness of 130 nm on the principal surface of the transparent substrate 24, depositing a first phase-change material film 27 of a binary alloy of Sb$_2$Se$_3$ to a thickness of 20 nm on the first protective film 26, and a second dielectric film or protective film 28 of a mixture of ZnS and SiO$_2$ to a thickness of 100 nm on the first phase-change material film 27.

Then, the transparent layer 23 is formed of an ultraviolet-curing resin to a thickness of 40 μm on the first information recording layer 21 by photopolymerization.

Thereafter, the second information recording layer 22 is formed on the transparent layer 23. Specifically, the second information recording layer 22 is formed by depositing a third dielectric film or protective film 29 of a mixture of ZnS and SiO$_2$ to a thickness of 130 nm on the transparent layer 23, depositing a second phase-change material film 30 of a ternary alloy of Ge$_2$Sb$_2$Tb$_5$ to a thickness of 22 nm on the third protective film 29, and a fourth dielectric film or protective film 31 of a mixture of ZnS and SiO$_2$ to a thickness of 12 nm on the second phase-change material film 30.

A reflecting film 32 of Al is deposited to a thickness of 150 nm on the second information recording layer 22, and then covered with a protective layer 33 of an ultraviolet-curing resin which has a thickness of 7 μm by a spin coating process.

The optical recording medium 20 shown in FIG. 1 has the first and second information recording layers 21, 22 as two phase-change information recording layers.

Figure 2:
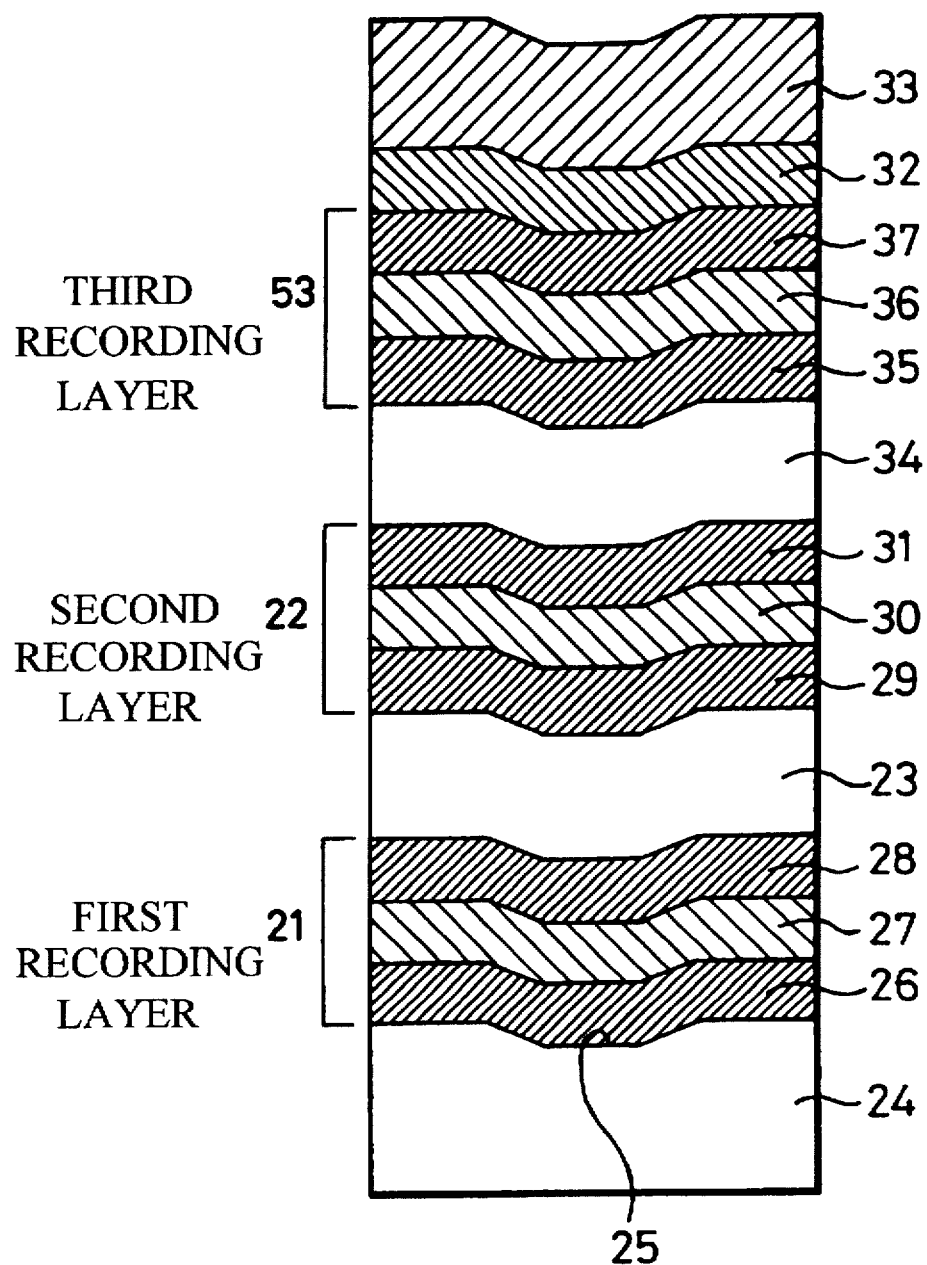
FIG. 2 is a fragmentary cross-sectional view of another optical recording medium to be initialized according to the present invention.

FIG. 2 shows in fragmentary cross section an optical recording medium 20 in the form of a phase-change optical disk having first, second, and third information recording layers 21, 22, 53 as three phase-change information recording layers. The first, second, and third information recording layers 21, 22, 53 record information by way of a change in an optical property, e.g., transmittance or reflectance, due to a phase change.

As shown in FIG. 2, a transparent substrate 24 comprises a polycarbonate substrate, for example, having on its principal surface small surface depressions 25 such as tracking servo grooves or the like. The small surface depressions 25 may be produced in the principal surface of the transparent substrate 24 when the transparent substrate 24 is injection-molded or may be defined in the principal surface of a flat transparent substrate with an ultraviolet-curing resin by photopolymerization.

The first information recording layer 21 is formed by depositing a first dielectric film or protective film 26 of a mixture of ZnS and SiO$_2$ to a thickness of 130 nm on the principal surface of the transparent substrate 24, depositing a first phase-change material film 27 of a binary alloy of Sb$_2$Se$_3$ to a thickness of 20 nm on the first protective film 26, and a second dielectric film or protective film 28 of a mixture of ZnS and SiO$_2$ to a thickness of 100 nm on the first phase-change material film 27.

Then, a transparent layer 23 is formed of an ultraviolet-curing resin to a thickness of 40 μm on the first information recording layer 21 by photopolymerization.

Thereafter, the second information recording layer 22 is formed on the transparent layer 23. Specifically, the second information recording layer 22 is formed by depositing a third dielectric film or protective film 29 of a mixture of ZnS and SiO$_2$ to a thickness of 130 nm on the transparent layer 23, depositing a second phase-change material film 30 of a ternary alloy of Ge$_2$Sb$_2$Tb$_5$ to a thickness of 20 nm on the third protective film 29, and a fourth dielectric film or protective film 31 of a mixture of ZnS and SiO$_2$ to a thickness of 100 nm on the second phase-change material film 30.

Then, a transparent layer 34 is formed of an ultraviolet-curing resin to a thickness of 40 μm on the second information recording layer 22 by photopolymerization.

Thereafter, the third information recording layer 53 is formed on the transparent layer 34. Specifically, the third information recording layer 53 is formed by depositing a fifth dielectric film or protective film 35 of a mixture of ZnS and SiO$_2$ to a thickness of 200 nm on the transparent layer 34, depositing a third phase-change material film 36 of a ternary alloy of Ge$_2$Sb$_2$Tb$_5$ to a thickness of 24 nm on the fifth protective film 35, and a sixth dielectric film or protective film 37 of a mixture of ZnS and SiO$_2$ to a thickness of 30 nm on the third phase-change material film 36.

A reflecting film 32 of Al is deposited to a thickness of 150 nm on the third information recording layer 53, and then covered with a protective layer 33 of an ultraviolet-curing resin which has a thickness of 7 μm by a spin coating process.

For recording information on the first and second information recording layers 21, 22 of the optical recording medium 20 shown in FIG. 1 or on the first, second, and third information recording layers 21, 22, 53 of the optical recording medium 20 shown in FIG. 2, the phase-change materials 27, 30 of the first and second information recording layers 21, 22 or the phase-change materials 27, 30, 36, of the first, second, and third information recording layers 21, 22, 53 are initialized by crystallization, for example, by initialization methods and apparatus according to the present invention as described below.

1st Embodiment

Figure 3:
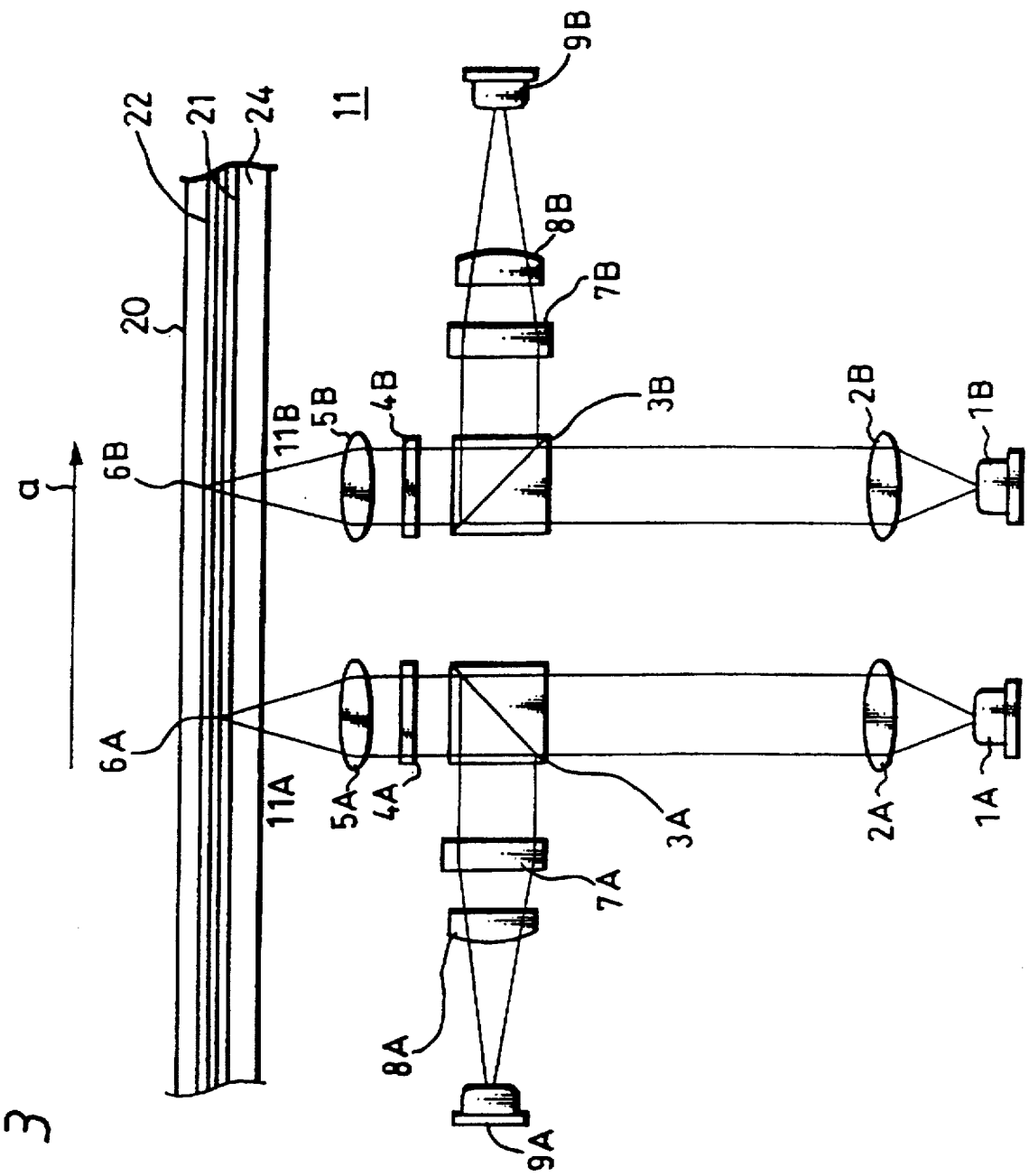
FIG. 3 is a schematic diagram of an initializing apparatus according to a first embodiment of the present invention.

According to a first embodiment shown in FIG. 3, the optical recording medium 20 shown in FIG. 1 which has the first and second information recording layers 21, 22 is initialized by heating, e.g., crystallizing, the first and second information recording layers 21, 22 simultaneously.

As shown in FIG. 3, an initializing apparatus according to the first embodiment has a light applying means 11 comprising first and second optical heads 11A, 11B which are positioned in confronting relation to the optical recording medium 20.

The optical recording medium 20 is rotated or moved in the direction indicated by the arrow "a" in FIG. 3 such that the optical recording medium 20 moves relatively to the first and second optical heads 11A, 11B.

The first and second optical heads 11A, 11B are positioned along the same circumferential track on the optical recording medium 20 in the direction in which the optical recording medium 20 moves.

In the first embodiment, the first and second optical heads 11A, 11B are basically structurally identical to each other. Specifically, the first and second optical heads 11A, 11B have respective semiconductor lasers 1A, 1B for emitting respective laser beams. The laser beams emitted by the semiconductor lasers 1A, 1B travel through respective collimator lenses 2A, 2B, respective polarizing beam splitters 3A, 3B, respective quarter-wave plates 4A, 4B, and respective objective lenses 5A, 5B, and converged thereby into respective beam spots 6A, 6B on the respective phase-change materials 27, 30 of the first and second information recording layers 21, 22.

Laser beams that are then reflected from the phase-change material films 27, 30 pass through the respective objective lenses 5A, 5B and the respective quarter-wave plates 4A, 4B to the respective polarizing beam splitters 3A, 3B. The laser beams are then reflected by the respective polarizing beam splitters 3A, 3B to travel through respective condenser lenses 7A, 7B and respective cylindrical lenses 8A, 8B, which jointly make up respective astigmatic focusing servo optical systems, to respective lightdetecting elements such as photodiodes 9A, 9B. The photodiodes 9A, 9B produce respective detected output signals which are used to positionally control the objective lenses 5A, 5B, for example, to focus the laser beams from the optical heads 11A, 11B onto the respective phase-change materials 27, 30 of the first and second information recording layers 21, 22.

The respective phase-change materials 27, 30 of the first and second information recording layers 21, 22 are heated by the respective beam spots 6A, 6B to respective predetermined temperatures, and hence crystallized, i.e., initialized.

Each of the objective lenses 5A, 5B has a numerical aperture N.A. of 0.5. Each of the semiconductor lasers 1A, 1B emits a laser beam having a wavelength of 810 nm.

The optical recording medium 20 is rotatable by a spindle motor. The optical heads 11A, 11B are controlled by respective actuator systems to position the beam spots 6A, 6B at innermost circumferential ends, for example, of areas to be initialized of the first and second information recording layers 21, 22. Then, the optical recording medium 20 is rotated by the spindle motor at a speed of 1000 rpm. Thereafter, the semiconductor lasers 1A, 1B are energized to emit respective laser beams which are applied as the beam spots 6A, 6B to the respective phase-change materials 27, 30 of the first and second information recording layers 21, 22. The optical heads 11A, 11B are controlled by the respective actuator systems under slide servo control to scan the areas to be initialized of the first and second information recording layers 21, 22, from the innermost to outermost circumferential ends thereof, with the beam spots 6A, 6B at a constant feed rate.

The laser beam applied to the first information recording layer 21 has a power of 12 mW, and the laser beam applied to the second information recording layer 22 has a power of 10 mW.

The first and second information recording layers 21, 22 are simultaneously initialized in the manner described above.

The laser beams emitted by the semiconductor lasers 1A, 1B may have the same wavelength and the same power, and the objective lenses 5A, 5B may have the same numerical aperture. However, the wavelengths and powers of the laser beams emitted by the semiconductor lasers 1A, 1B, and the numerical apertures of the objective lenses 5A, 5B may be selected independently of each other. Therefore, a wide range of initializing conditions is available for initializing the first and second information recording layers 21, 22, and hence the first and second information recording layers 21, 22 can be initialized under optimum conditions.

2nd Embodiment

Figure 4:
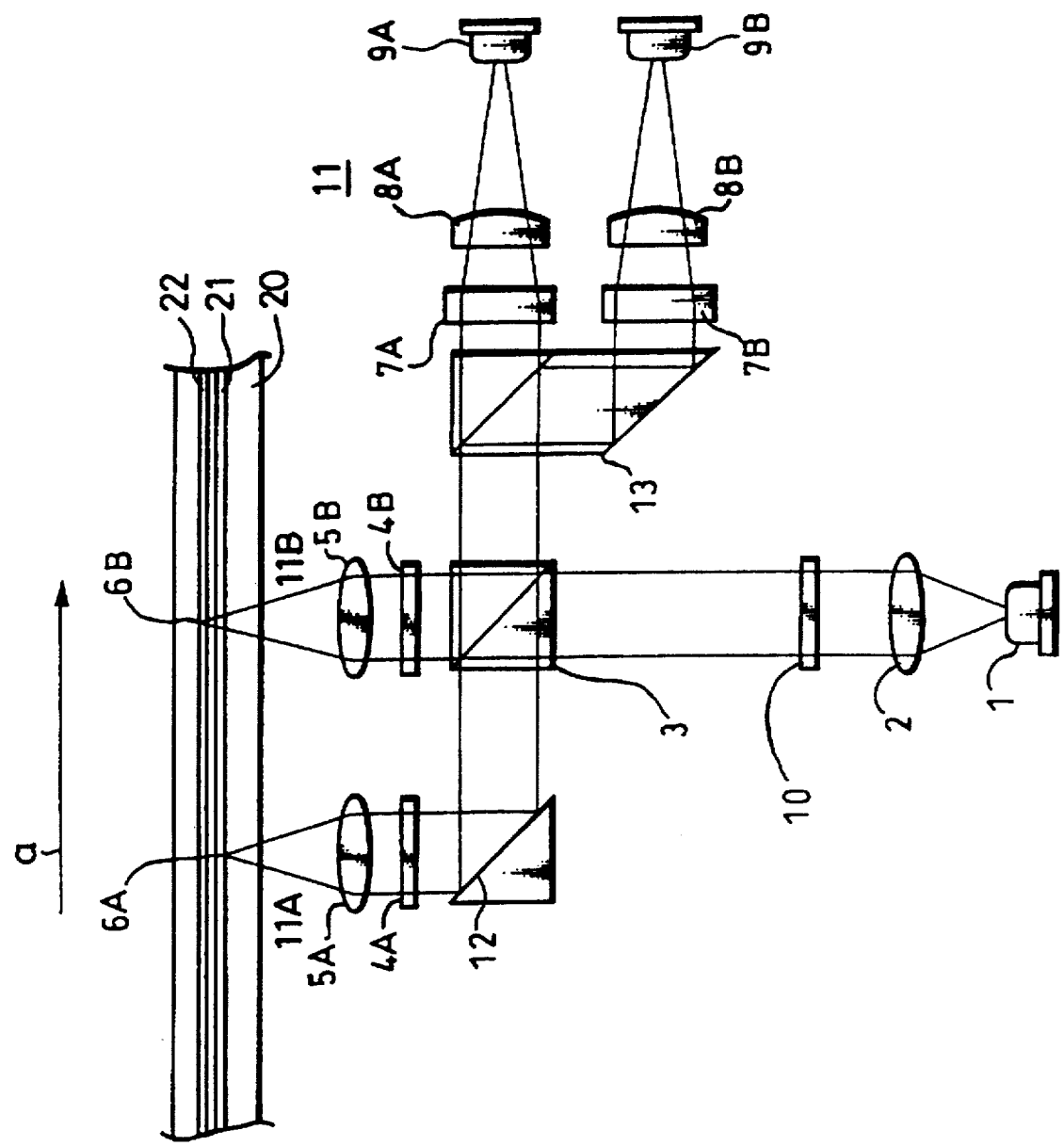
FIG. 4 is a schematic diagram of an initializing apparatus according to a second embodiment of the present invention.

According to a second embodiment shown in FIG. 4, the optical recording medium 20 shown in FIG. 1 which has the first and second information recording layers 21, 22 is initialized by heating, e.g., crystallizing, the first and second information recording layers 21, 22 simultaneously, as with the first embodiment. However, as shown in FIG. 4, first and second optical heads 11A, 11B which have respective objective lenses 5A, 5B are not entirely independently of each other, but have certain common components, including a semiconductor laser.

As shown in FIG. 4, the optical recording medium 20 is rotated or moved in the direction indicated by the arrow "a" in FIG. 3 such that the optical recording medium 20 moves relatively to the first and second optical heads 11A, 11B. The first and second optical heads 11A, 11B are positioned along the same circumferential track on the optical recording medium 20 in the direction in which the optical recording medium 20 moves.

According to the second embodiment, the first and second optical heads 11A, 11B share a semiconductor laser 1, a collimator lens 2, a half-wave plate 10, and a polarizing beam splitter 3. A laser beam emitted by the semiconductor laser 1 and passing through the collimator lens 2 and the half-wave plate 10 is divided into two laser beams by the polarizing beam splitter 3. One of the laser beams is reflected by a mirror 12 and travels through a quarter-wave plate 4A and an objective lens 5A, which converges the laser beam into a beam spot 6A on the phase-change material film 27 of the first information recording medium 21. The mirror 12, the quarter-wave plate 4A, and the objective lens 5A jointly make up part of the first optical head 11A. The other laser beam travels through a quarter-wave plate 4B and an objective lens 5B, which converges the laser beam into a beam spot 6B on the phase-change material film 30 of the second information recording medium 22. The quarter-wave plate 4B and the objective lens 5B jointly make up part of the second optical head 11B.

Laser beams that are then reflected from the phase-change material films 27, 30 are guided by the polarizing beam splitter 3 to a beam splitter 13, which guide the laser beams to travel through respective condenser lenses 7A, 7B and respective cylindrical lenses 8A, 8B, which jointly make up respective astigmatic focusing servo optical systems, to respective light-detecting elements such as photodiodes 9A, 9B. The photodiodes 9A, 9B produce respective detected output signals which are used to positionally control the objective lenses 5A, 5B, for example, to focus the laser beams from the optical heads 11A, 11B onto the respective phase-change materials 27, 30 of the first and second information recording layers 21, 22.

The semiconductor laser 1 emits a laser beam having a wavelength of 810 nm. Each of the objective lenses 5A, 5B has a numerical aperture N.A. of 0.5.

The optical recording medium 20 is rotatable by a spindle motor. The optical heads 11A, 11B are controlled by respective actuator systems to position the beam spots 6A, 6B at innermost circumferential ends, for example, of areas to be initialized of the first and second information recording layers 21, 22. Then, the optical recording medium 20 is rotated by the spindle motor at a speed of 1000 rpm. Thereafter, the semiconductor lasers 1A, 1B are energized to emit respective laser beams which are applied as the beam spots 6A, 6B to the respective phase-change materials 27, 30 of the first and second information recording layers 21, 22. The optical heads 11A, 11B are controlled by the respective actuator systems under slide servo control to scan the areas to be initialized of the first and second information recording layers 21, 22, from the innermost to outermost circumferential ends thereof, with the beam spots 6A, 6B at a constant feed rate.

The laser beam applied to the first information recording layer 21 has a power of 12 mW, and the laser beam applied to the second information recording layer 22 has a power of 10 mw.

The first and second information recording layers 21, 22 are simultaneously initialized in the manner described above.

The two laser beams which are detected by the respective photodiodes 9A, 9B can be distinguished from each other as by inverting the polarities of the focusing servo optical systems.

Initializing conditions for the first and second information recording layers 21, 22, e.g., applied powers of the laser beams, can be selected by controlling the power of the semiconductor laser 1 and the half-wave plate 10.

3rd Embodiment

According to a third embodiment, the optical recording medium 20 shown in FIG. 2 which has the first, second, and third information recording layers 21, 22, 53 is initialized by heating, e.g., crystallizing, the first, second, and third information recording layers 21, 22, 53 simultaneously.

Figure 5:
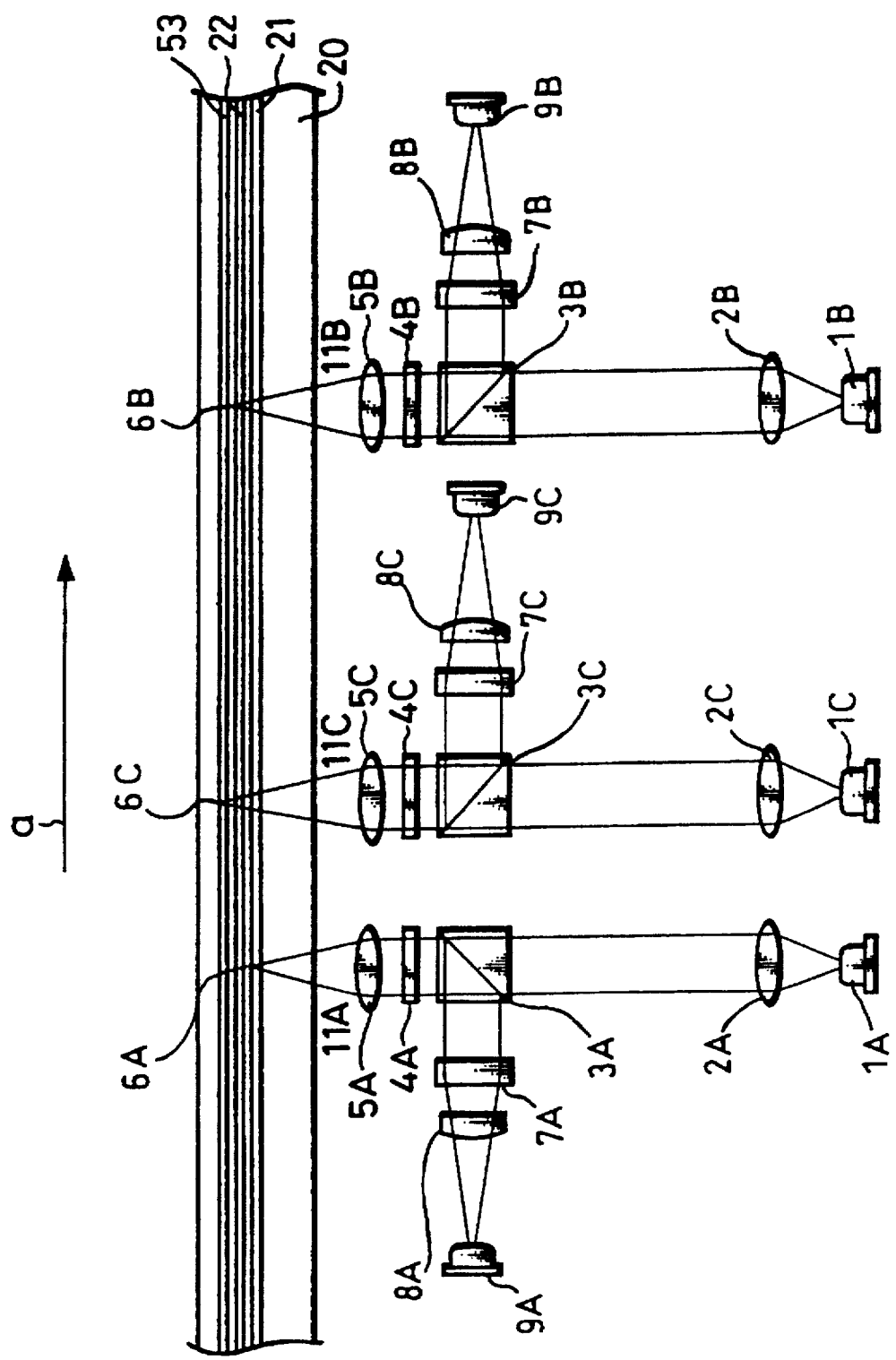
FIG. 5 is a schematic diagram of an initializing apparatus according to a third embodiment of the present invention.

FIG. 5 shows an initializing apparatus according to the third embodiment. Those parts of the initializing apparatus shown in FIG. 5 which are identical to those shown in FIG. 3 are denoted by identical reference characters, and will not be described in detail below. The initializing apparatus according to the third embodiment has, in addition to the first and second optical heads 11A, 11B that are completely independent of each other, a third optical head 11C which is of a structure identical to that of each of the first and second optical heads 11A, 11B. The components of the third optical head 11C which correspond to those of each of the first and second optical heads 11A, 11B are denoted by identical reference numerals with a suffix C in place of the suffixes A, B.

Each of the objective lenses 5A, 5B, 5C has a numerical aperture N.A. of 0.5. Each of the semiconductor lasers 1A, 1B, 1C emits a laser beam having a wavelength of 810 nm.

The optical recording medium 20 which has the first, second, and third information recording layers 21, 22, 53 is rotatably positioned in front of the first, second, and third optical heads 11A, 11B, 11C. The first, second, and third optical heads 11A, 11B, 11C are positioned along the same circumferential track on the optical recording medium 20 in the direction indicated by the arrow "a" in which the optical recording medium 20 rotates or moves.

The optical recording medium 20 is rotatable by a spindle motor. The optical heads 11A, 11B, 11C are controlled by respective actuator systems to position the beam spots 6A, 6B, 6C at innermost circumferential ends, for example, of areas to be initialized of the first, second, and third information recording layers 21, 22, 53. Then, the optical recording medium 20 is rotated by the spindle motor at a speed of 1000 rpm. Thereafter, the semiconductor lasers 1A, 1B, 1C are energized to emit respective laser beams which are applied as the beam spots 6A, 6B, 6C to the respective phase-change materials 27, 30, 36 of the first, second, and third information recording layers 21, 22, 53. The optical heads 11A, 11B, 11C are controlled by the respective actuator systems under slide servo control to scan the areas to be initialized of the first, second, and third information recording layers 21, 22, 53, from the innermost to outermost circumferential ends thereof, with the beam spots 6A, 6B, 6C at a constant feed rate.

The laser beam applied to the first information recording layer 21 has a power of 12 mW, the laser beam applied to the second information recording layer 22 has a power of 12 mW, and the laser beam applied to the third information recording layer 53 has a power of 10 mW.

The first, second, and third information recording layers 21, 22 are simultaneously initialized in the manner described above.

In each of the above embodiments, the initializing apparatus has a plurality of optical heads, i.e., objective lenses. However, a single optical head, i.e., a single objective lens, may be used to simultaneously initialize two or more information recording layers.

4th Embodiment

Figure 6:
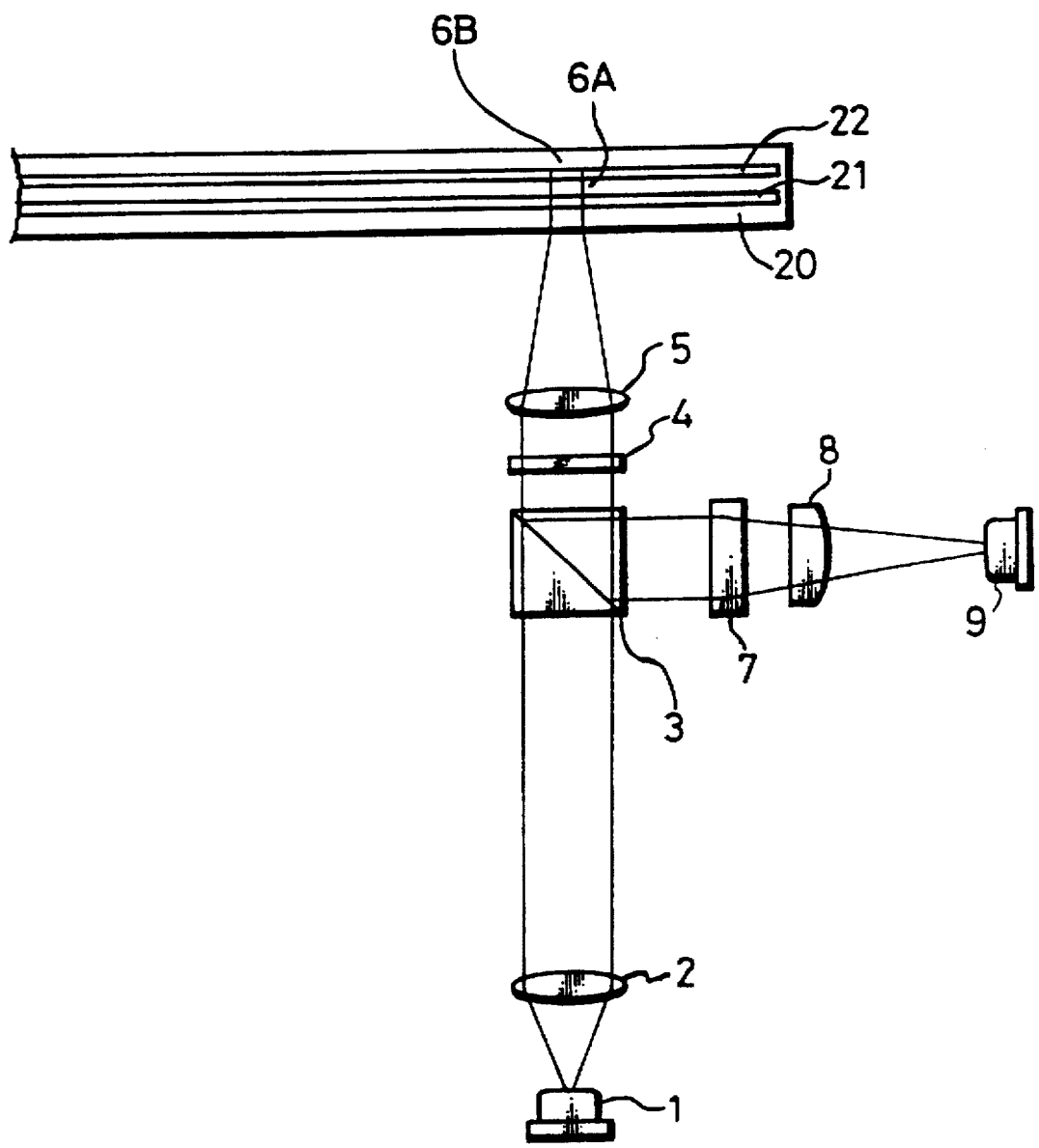
FIG. 6 is a schematic diagram of an initializing apparatus according to a fourth embodiment of the present invention.

According to a fourth embodiment shown in FIG. 6, the first and second information recording layers 21, 22 of the optical recording medium 20 shown in FIG. 1 are simultaneously initialized by a single optical head.

As shown in FIG. 6, an optical head has a semiconductor laser 1 for emitting a laser beam. The laser beam emitted by the semiconductor laser 1 travels through a collimator lens 2, a polarizing beam splitter 3, a quarter-wave plate 4, and an objective lens 5, and converged thereby into two beam spots 6A, 6B on the respective phase-change materials 27, 30 of the first and second information recording layers 21, 22.

A laser beam that is then reflected from the phase-change material films 27, 30 passes through the objective lens 5 and the quarter-wave plate 4 to the polarizing beam splitter 4. The laser beam is then reflected by the polarizing beam splitter 3 to travel through a condenser lens 7 and a cylindrical lens 8, which jointly make up an astigmatic focusing servo optical system, to a lightdetecting element such as a photodiode 9. The photodiode 9 produces a detected output signal which is used to positionally control the objective lens 5, for example, to focus the laser beam from the optical head 11 onto both the phase-change materials 27, 30 at the same time.

The objective lens 5 has a numerical aperture N.A. represented by $(\lambda/d)^{1/2}$ where d is the thickness of the transparent layer 23 between the first and second information recording layers 21, 22 and $\lambda$ is the wavelength of the laser beam emitted by the semiconductor laser 1. The depth of focus of the objective lens 5 is expressed by $\pm(\lambda/2N.A.^2)$. The numerical aperture N.A. of the objective lens 5 is selected to be of a smaller value than the numerical apertures N.A. (0.4–0.6) of general optical heads for applying the laser beam simultaneously to the first and second information recording layers 21, 22 thereacross. In the fourth embodiment, d=40 µm, $\lambda$=810 nm, and the numerical aperture N.A. of the objective lens 5 is 0.13.

The optical recording medium 20 is rotatable by a spindle motor. The optical head 11 is controlled by an actuator system to position the beam spots 6A, 6B at innermost circumferential ends, for example, of areas to be initialized of the first and second information recording layers 21, 22. Then, the optical recording medium 20 is rotated by the spindle motor at a speed of 1000 rpm. Thereafter, the semiconductor laser 1 is energized to emit a laser beam which is applied as the beam spots 6A, 6B to the respective phase-change materials 27, 30 of the first and second information recording layers 21, 22. The optical head 1 is controlled by the actuator system under slide servo control to scan the areas to be initialized of the first and second information recording layers 21, 22, from the innermost to outermost circumferential ends thereof, with the beam spots 6A, 6B at a constant feed rate.

The first and second information recording layers 21, 22 are simultaneously initialized in the manner described above.

The wavelength of the laser beam emitted by the semiconductor laser 1 is selected to satisfy the relationship: $N.A. \leq (\lambda/d)^{1/2}$. The power of the laser beam may be selected to be of appropriate values.

If the numerical aperture N.A. of the objective lens were greater than $(\lambda/d)^{1/2}$, then the depth of focus would be too small to initialize the first and second information recording layers 21, 22 simultaneously.

5th Embodiment

According to a fifth embodiment shown in FIG. 7, the first and second information recording layers 21, 22 of the optical recording medium 20 shown in FIG. 1 are simultaneously initialized by a single optical head.

As shown in FIG. 7, the optical head has no objective lens, but a collimator lens 2 for converting a laser beam emitted by a semiconductor laser 1 into a parallel laser beam, which is applied to the optical recording medium 20 for thereby initializing the first and second information recording layers 21, 22 simultaneously.

The optical recording medium 20 is rotatable by a spindle motor. The optical head is controlled by an actuator system to position the beam spots of a laser beam at innermost circumferential ends, for example, of areas to be initialized of the first and second information recording layers 21, 22. Then, the optical recording medium 20 is rotated by the spindle motor at a speed of 1000 rpm. There-after, the semiconductor laser 1 is energized to emit a laser beam which is applied as the beam spots to the respective phase-change materials 27, 30 of the first and second information recording layers 21, 22. The optical head 1 is controlled by the actuator system under slide servo control to scan the areas to be initialized of the first and second information recording layers 21, 22, from the innermost to outermost circumferential ends thereof, with the beam spots at a constant feed rate.

The first and second information recording layers 21, 22 are simultaneously initialized in the manner described above.

The wavelength and power of the laser beam emitted by the semiconductor laser 1 are selected to be of appropriate values.

In the fifth embodiment, the optical system of the optical head comprises the collimator lens 2 only. However, the optical system is not limited to the collimator lens 2, but may be of any arrangement insofar as it can apply a laser beam emitted by the semiconductor laser 1 as a parallel laser beam to the optical recording medium 20.

In the first through fifth embodiments, the optical recording medium 20 is initialized when the areas to be initialized of the first and second information recording layers 21, 22 are scanned from the innermost to outermost circumferential ends thereof with the beam spots. However, the areas to be initialized of the first and second information recording layers 21, 22 may be scanned from the outer-most to innermost circumferential ends thereof with the beam spots. The optical recording medium 20 may be initialized in any radial area thereof ranging between any two desired radii.

In the first through fourth embodiments shown in FIGS. 3 through 6, the quarter-wave plates 4A, 4B, 4C, 4 may be dispensed with. If the quarter-wave plates 4A, 4B, 4C, 4 are dispensed with, then each of the polarizing beam splitters 3A, 3B, 3C, 3 is replaced with a beam splitter.

In each of the first through fifth embodiments, the optical recording medium and the optical head are not limited to the illustrated layout, but may be positioned in various layouts. For example, the optical recording medium and the optical head may be vertically switched around in position.

The focusing servo optical systems are not limited to the illustrated astigmatic principles, but may be of any of various other types such as the knife-edge method.

In each of the first through fifth embodiments, all the information recording layers of the optical recording medium are not required to be rewritable information recording layers that need to be initialized. If some of the information recording layers of the optical recording medium do not need to be initialized, then those information recording layers may not be irradiated with laser beams from the optical heads.

The optical recording medium which is initialized according to the present invention is not limited to an optical recording medium having rewritable information recording layers. The principles of the present invention are applicable to optical recording mediums which have a plurality of ROM or WO information recording layers that need to be initialized at the time they are manufactured. Rewritable and WO information recording layers are not limited to a phase-change information recording layer, but may be an information recording layer of a magneto-optical material, a photochromic material, an alloy material, or the like which changes its optical property upon exposure to light whose intensity is greater than a given level, for thereby recording information, and which needs to be initialized.

The optical recording medium is not limited to a disk shape, but may be of any of various shapes such as a card or the like. The optical recording medium may be any of various ROM optical recording mediums having a phase-change recording layer on recording pits, which need to be initialized for readout, as disclosed in Japanese laid-open patent publications Nos. 3-292632 and 5-89511, for example.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. A method of initializing a multiple-recording-layer optical recording medium, comprising the steps of:

providing a multiple-recording-layer optical recording medium having a plurality of recording layers to be initialized by exposure to light, with a transparent layer interposed between the recording layers; and thereafter, applying light simultaneously to the recording layers to initialize the recording layers simultaneously, using an objective lens having a numerical aperture of at most $(\lambda/d)^{1/2}$ where d is the thickness of the transparent layer and $\lambda$ is the wavelength of the light beam.

2. A method according to claim 1, wherein each of the recording layers is made of a phase-change material.

3. An apparatus for initializing a multiple-recording-layer recording medium having a plurality of recording layers to be initialized by exposure to light, with a transparent layer interposed between the recording layers, comprising:

light applying means for applying light simultaneously to the recording layers to initialize the recording layers simultaneously, said light applying means comprising a light source for emitting a light beam; and an objective lens for applying the light beam emitted by said light source to said first recording layer and said second recording layer to initialize said first recording layer and said second recording layer;

said objective lens having a numerical aperture of at most $(\lambda/d)^{1/2}$ where d is the thickness of the transparent layer and $\lambda$ is the wavelength of the light beam.

4. An apparatus according to claim 3, wherein said light applying means has a plurality of objective lenses associated with the recording layers, respectively, for focusing light beams respectively onto the recording layers.

5. An apparatus according to claim 3, wherein each of the recording layers is made of a phase-change material.

6. An apparatus for initializing a multiple-recording-layer optical recording medium having a substrate, a first recording layer to be initialized by exposure to light, the first recording layer being disposed on the substrate, a transparent layer disposed on the first recording layer, and a second recording layer to be initialized by exposure to light, the second recording layer being disposed on the transparent layer, comprising:

a light source for emitting a light beam; and an objective lens for applying the light beam emitted by said light source to said first recording layer and said second recording layer to initialize said first recording layer and said second recording layer;

said objective lens having a numerical aperture of at most $(\lambda/d)^{1/2}$ where d is the thickness of the transparent layer and $\lambda$ is the wavelength of the light beam.

7. An apparatus according to claim 6, wherein each of the recording layers is made of a phase-change material.

* * * * *